United States Patent
Hollung et al.

(10) Patent No.: US 10,483,842 B2
(45) Date of Patent: Nov. 19, 2019

(54) DRIVE SYSTEM HAVING DC POWER SUPPLY FOR A SUBMARINE

(71) Applicants: ThyssenKrupp Marine Systems GmbH, Kiel (DE); ThyssenKrupp AG, Essen (DE)

(72) Inventors: Achim Hollung, Preetz (DE); Norbert Dannenberg, Krummesse (DE); Tim Sievers, Jevenstedt (DE)

(73) Assignees: THYSSENKRUPP MARINE SYSTEMS GMBH, Kiel (DE); THYSSENKRUPP AG, Essen (DE)

( * ) Notice: Subject to any disclaimer, the term of this patent is extended or adjusted under 35 U.S.C. 154(b) by 0 days.

(21) Appl. No.: 15/318,753

(22) PCT Filed: Jun. 22, 2015

(86) PCT No.: PCT/EP2015/063901
§ 371 (c)(1),
(2) Date: Dec. 14, 2016

(87) PCT Pub. No.: WO2015/197507
PCT Pub. Date: Dec. 30, 2015

(65) Prior Publication Data
US 2017/0133928 A1    May 11, 2017

(30) Foreign Application Priority Data
Jun. 27, 2014    (DE) ......................... 10 2014 109 092

(51) Int. Cl.
*B63G 8/00* (2006.01)
*B63G 8/08* (2006.01)
*H02M 3/04* (2006.01)

(52) U.S. Cl.
CPC ............... *H02M 3/04* (2013.01); *B63G 8/00* (2013.01); *B63G 8/08* (2013.01)

(58) Field of Classification Search
USPC .................................................. 307/9.1, 10.1
See application file for complete search history.

(56) References Cited

U.S. PATENT DOCUMENTS

| 6,777,909 B1 | 8/2004 | Aberle et al. |
| 2006/0102397 A1 | 5/2006 | Buck et al. |

(Continued)

FOREIGN PATENT DOCUMENTS

| DE | 36 00 258 A1 | 7/1987 |
| DE | 199 54 306 A1 | 7/2001 |

(Continued)

OTHER PUBLICATIONS

English translation of International Search Report for International patent application No. PCT/EP2015/063901; dated Oct. 8, 2015.

(Continued)

*Primary Examiner* — Rexford N Barnie
*Assistant Examiner* — Xuan Ly
(74) *Attorney, Agent, or Firm* — thyssenkrupp North America, Inc.

(57) ABSTRACT

A drive system for a submarine may include a DC power supply system for supplying electrical energy to a drive of the submarine and a plurality of battery strings, which each may comprise a plurality of series-connected battery modules. The battery strings may each be connected to a string connection unit via which the battery string can be selectively connected to or disconnected from the DC power supply system. The string current flowing in the battery string can be adjusted by the string connection unit. The present disclosure also concerns corresponding methods for operating the drive system of the submarine.

12 Claims, 2 Drawing Sheets

(56) References Cited

U.S. PATENT DOCUMENTS

| | | | |
|---|---|---|---|
| 2010/0009225 A1 | 1/2010 | Saito | |
| 2011/0144822 A1* | 6/2011 | Choi | H02J 3/32 |
| | | | 700/297 |
| 2011/0175451 A1* | 7/2011 | Moon | H02J 9/062 |
| | | | 307/66 |
| 2011/0317321 A1* | 12/2011 | Vogel | H02H 3/025 |
| | | | 361/87 |
| 2012/0229101 A1* | 9/2012 | Fertman | H02J 7/0024 |
| | | | 320/167 |

FOREIGN PATENT DOCUMENTS

| | | | |
|---|---|---|---|
| DE | 102 33 821 A1 | | 2/2004 |
| DE | 103 31 823 A1 | | 2/2005 |
| DE | 10 2007 053 229 A1 | | 5/2008 |
| DE | 102007053229 | * | 5/2008 |
| DE | 10 2008 053 074 A1 | | 1/2010 |
| DE | 10 2009 014 386 A1 | | 9/2010 |
| DE | 10 2009 027 836 A1 | | 1/2011 |
| DE | 10 2012 204 965 A1 | | 10/2013 |
| DE | 102012204965 | * | 10/2013 |
| DE | 10 2012 208 313 A1 | | 11/2013 |
| JP | 2014-110692 A | | 6/2014 |
| WO | 2002/21659 A1 | | 3/2002 |
| WO | 2006/089904 A1 | | 8/2006 |

OTHER PUBLICATIONS

English language Abstract for DE 10 2007 053 229 A1 listed above.
English language Abstract for DE 10 2009 014 386 A1 listed above.

* cited by examiner

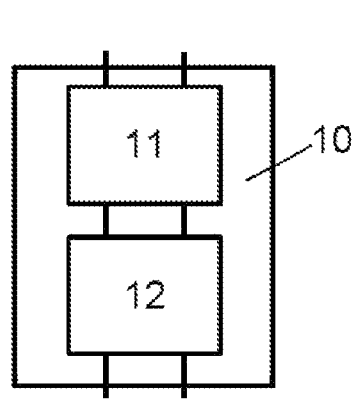
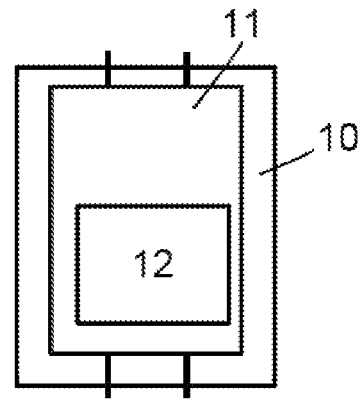
Fig. 3            Fig. 4
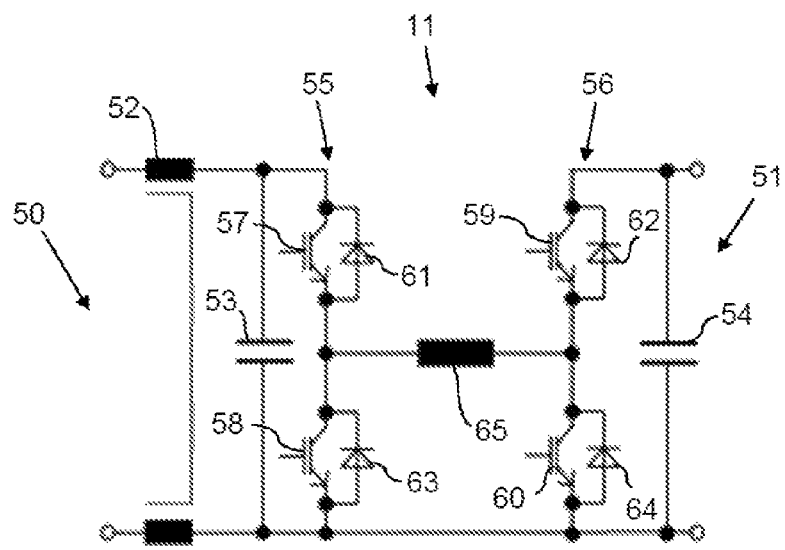
Fig. 5

DRIVE SYSTEM HAVING DC POWER SUPPLY FOR A SUBMARINE

CROSS REFERENCE TO RELATED APPLICATIONS

This application is a U.S. National Stage Entry of International Patent Application Serial Number PCT/EP2015/063901, filed Jun. 22, 2015, which claims priority to German Patent Application No. DE 10 2014 109 092.6 filed Jun. 27, 2014, the entire contents of both of which are incorporated herein by reference.

FIELD

The present disclosure generally relates to drive systems for submarines.

BACKGROUND

Submarine drive systems are generally provided with a DC power supply system for the supply of the electric drives of the submarine, for example the supply of propeller drives. In many cases, energy stores configured in the form of batteries are associated with the DC power supply system. Batteries are customarily combined in battery modules, and a number of such battery modules are connected in series to form a battery string. In order to deliver the high battery capacities required for the supply of submarine drives, it is customary to connect a number of battery strings in parallel.

A drive system of this type for a submarine is known, for example, from DE 102007053229 A1. In addition to a DC power supply system, the drive system comprises a number of battery strings, each comprising a plurality of series-connected battery modules. The battery strings are each connected to the DC power supply system by means of a string connection unit, via which the battery string can be selectively connected to the DC power supply system or disconnected from the DC power supply system. Accordingly, in the event of an increased current in the battery string, for example further to a short-circuit, it is possible to isolate the battery string from the DC power supply system by means of the string connection unit.

In practice, the short-circuit protection function of the known drive system is entirely proven. In the known drive system, however, it has emerged that the overcharging and/or exhaustive discharging of the battery strings cannot be effectively prevented. Specifically, this is problematic where battery modules configured as lithium-ion batteries are to be used. The overcharging or exhaustive discharging of battery modules can result in irreversible damage to the battery modules, e.g. associated with exothermic breakdown reactions. The service life of battery modules, and the availability of the drive system, are reduced accordingly.

BRIEF DESCRIPTION OF THE FIGURES

FIG. 3 is a schematic block circuit diagram of a first configuration of a string connection unit.

FIG. 4 is a schematic block circuit diagram of a second configuration of a string connection unit.

FIG. 5 is a circuit diagram of an example bidirectional voltage converter.

DETAILED DESCRIPTION

Figure 1:
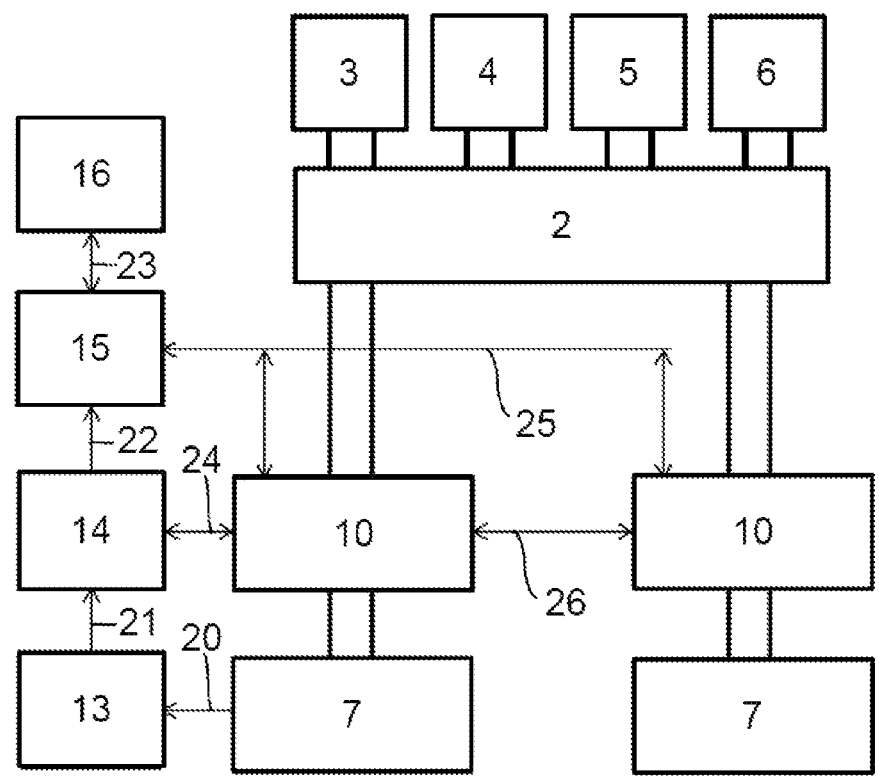
FIG. 1 is a schematic block circuit diagram of an example drive system for a submarine.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally concerns drive systems for submarines. In some examples, a drive system may comprise a DC power supply system for supplying electrical energy to a drive of the submarine and a number of battery strings, each having a plurality of series-connected battery modules, wherein the battery strings may each be connected to a string connection unit, via which the battery string can be selectively connected to the DC power supply system or disconnected from the DC power supply system. The present disclosure also concerns methods for operating such drive systems.

One example object of the present disclosure is to increase the availability of drive systems.

In a drive system of the aforementioned type, the object is fulfilled, wherein the string current flowing in the battery string can be adjusted by the string connection unit.

Using the string connection unit, the current during the charging of the battery string can be adjusted in order to prevent any overcharging. Moreover, the discharge current can be adjusted in order to ensure that no exhaustive discharge of the battery string occurs. Any unwanted overcharging and/or exhaustive discharging can thus be prevented, thereby increasing the service life of the battery modules, and consequently the availability of the drive system.

In the drive system according to the invention, the string connection unit fulfills a dual function. By means of the string connection unit, the battery string can be selectively connected to the DC power supply system or disconnected from the DC power supply system, and the string current on the connected battery string can be adjusted.

In an advantageous configuration of the invention, the string connection unit incorporates a voltage converter. The voltage converter can be connected between the DC power supply system and the battery string, such that a system voltage on the DC power supply system side can be converted into a string voltage on the battery string side, and vice versa. The voltage converter is preferably configured with a bidirectional design, such that energy can be selectively transmitted from the DC power supply system to the battery string or from the battery string to the DC power supply system. By means of the bidirectional voltage converter, charging and discharging processes on the battery string connected to the string connection unit can be regulated. The voltage converter is preferably configured as a DC voltage converter (or as a DC/DC-converter or DC chopper converter). By means of a DC voltage converter, a DC voltage present on one terminal of the DC voltage converter can be converted into a quantitatively different DC voltage on a second terminal of the DC voltage converter.

In an advantageous configuration, the voltage converter is configured such that a system voltage on the DC power supply system is selectively convertible into a higher or lower string voltage on the battery string. By the selective setting of the string voltage on the battery modules, the regulation of voltages on the individual battery modules can be achieved. For example, it is possible to influence the discharge currents of individual strings while maintaining the same overall battery capacity. If the drive system is additionally provided with a fuel cell which is connected to the DC power supply system, the setting of the working point by the regulation of the system voltage can be simplified.

It is particularly advantageous if the voltage converter is configured such that both the system voltage on the power supply system and the string voltage on the battery string are adjustable.

In an advantageous configuration, the string connection unit is configured such that the battery string can be disconnected from the DC power supply system. This is advantageous in that the current flow between the DC power supply system and the battery string can be interrupted. Preferably, the battery string is galvanically isolatable from the DC power supply system. Galvanic isolation from the DC power supply system may be necessary, for example, for the execution of maintenance operations on the battery string.

The string connection unit preferably incorporates a switching device, connected in series to the DC voltage converter, for the galvanic isolation of the battery string from the DC power supply system. The switching device may be provided, for example, with a circuit breaker.

A configuration has also proven to be advantageous, in which the string connection unit is provided with a common housing for the voltage converter and the switching device. By this arrangement in a common housing, cable routes between the voltage converter and the switching device can be kept short. Moreover, a compact configuration of the string connection unit is thus possible which, in the context of the limited availability of space in submarines, is advantageous. A configuration of the string connection unit in the form of a retrofit assembly is particularly advantageous, thereby permitting the integration of the string connection unit in existing drive systems.

The battery modules are advantageously comprised of lithium-ion batteries. In comparison with conventional lead-acid batteries, lithium-ion batteries show a superior energy density and are maintenance-free, but are also associated with the disadvantage of increased susceptibility to exhaustive discharging and overcharging. By means of the voltage converter in the string connection unit, lithium-ion batteries can be protected against exhaustive discharging and overcharging. It is thus possible to exploit the advantages of lithium-ion batteries in the drive system.

Preferably, the string connection units in the drive system are mutually independently controllable, such that different string voltages and/or string currents can be set in the different battery strings. By this arrangement, compensating currents flowing between the individual battery strings can be reduced. Compensating currents of this type can occur, for example, as a result of variations in the state of charge of the different battery strings. By the independent control of the string connection units, specifically of the voltage converter in the string connection units, it is possible to set the string voltages and/or string currents on the battery strings in such a way that compensating currents are suppressed.

In an advantageous configuration, the string connection units are controllable by means of a drive system control unit. The drive system control unit can be a central control unit, by means of which all the string connection units can be controlled. It is particularly advantageous if the drive system control unit is provided with a user interface, via which an operator can enter commands for the control of the string connection units. For example, it may be provided that individual battery strings, by means of the drive system control unit and specifically by means of the user interface on the drive system control unit, can be selectively switched-in or switched-out.

In this regard, it has proved to be particularly advantageous if the string connection units are controllable by means of a dedicated string control unit for each string, which takes precedence over the drive system control unit. The precedence of the string control unit can prevent a circumstance whereby commands from the string control unit, on the grounds of differing commands from the drive system control unit, cannot be implemented on the string connection unit. The string control unit can be configured, for example, as a battery management system, which sets a working point for the battery string on the basis of measurements of characteristic battery variables. Optionally, it can be provided that the disconnection or connection of the battery string from/to the DC power supply system is controllable by the string control unit. This has an advantage in that, in the event of the occurrence of unwanted operating states on the battery modules such as, for example, a short-circuit, overheating, or an unwanted state of charge, the battery string can be isolated from the DC power supply system, in order to protect the battery modules against further damage and/or to maintain the operation of the drive system. Advantageously, a release signal can be generated by the string control unit, which releases the control of the string connection unit by the drive system control unit.

A configuration is preferred in which a fuel cell is associated with the DC power supply system. Energy can be supplied to the drive system by the fuel cell.

In a method of aforementioned type, a contribution to the fulfillment of the object is provided in that the string current flowing in the battery string is set by means of the string connection unit. The same advantages proceed therefrom as those described above in respect of the device according to the invention.

In an advantageous configuration of the method, the string connection unit, specifically a voltage converter in the string current unit, restricts the string current if the string current exceeds a predefined first limiting value. The voltage converter can thus be controlled such that the string current—whether flowing in the direction of the DC power supply system or in the direction of the battery string—is restricted if a first limiting value is exceeded. Accordingly, any increases in current associated with compensating currents between the different battery strings or with defects in the battery modules can be effectively restricted. Moreover, any increase in short-circuit currents can be controlled.

In this connection, it is preferred that the string connection unit disconnects the battery string from the DC power supply system if the string current exceeds a predefined second limiting value, which is quantitatively larger than the first limiting value. By a staggered method of this type, any string currents which cannot be limited by the voltage converter can be switched-out.

Alternatively or additionally, the method can also employ the characteristics described with reference to the drive system according to the invention.

With reference now to the figures, additional details, characteristics and advantages of the present disclosure proceed from the figures, and from the following description of preferred forms of embodiment, with reference to the figures. The figures illustrate exemplary forms of embodiment of the present disclosure only, which do not restrict the scope of the present disclosure.

In the various figures, equivalent components are identified throughout by the same reference numbers and thus, in general, are only described or mentioned once.

FIG. 1 represents a drive system 1 of a submarine. The drive system comprises a drive 3 which is configured, for example, as a propeller drive, by means of which the submarine can be driven. The drive 3 is connected to a DC power supply system 2, which is also described as a propulsion system. Electrical energy can be supplied to the drive 3 by the DC power supply system 2.

The energy required for the propulsion of the submarine can be obtained from various energy sources 4, 5, 6, which are described hereinafter. A first energy source is configured as a generator 4, for example as a diesel generator. Moreover, a second energy source is provided, which is configured as a fuel cell 5. Fuel cells have an advantage, in that they can be operated noiselessly, and the operation thereof is thus preferred during the silent running of the submarine. The drive system according to the exemplary embodiment also has a charging terminal 6, by means of which an external energy source is connectable to the drive system 1. Via the charging terminal, the drive system can be connected, for example, to an external power supply system while the submarine is at rest.

Optionally, an on-board system of the submarine can be connected to the DC power supply system 2, by means of which further electrical consumers can be supplied.

Figure 2:
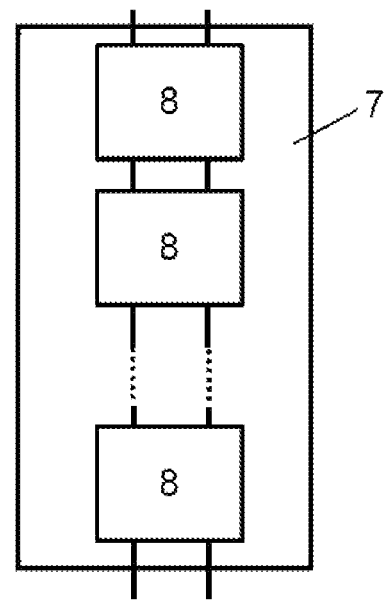
FIG. 2 is a schematic block circuit diagram of an example battery string.

The drive system 1 is moreover provided with an energy store, which is comprised of a number of battery strings 7. For example, 25-50 battery strings may be provided. The battery strings 7 are comprised of a plurality of series-connected battery modules 8, cf. FIG. 2. The battery modules 8 have a number of battery cells, which can be configured, for example, as lithium-ion battery cells. As can also be seen from FIG. 1, each of the battery strings 7 is connected to the DC power supply system 2 via a string connection unit 10.

In the drive system 1, the string connection units 10 assume a dual function. By means of the string connection units 10, the battery strings 7 can be selectively galvanically connected to the DC power supply system 2 or galvanically isolated from the DC power supply system 2, and the respective string current on the battery strings 7 can be set. By means of the string connection unit 10, the current during the charging of the battery string can be set in order to prevent any overcharging. Moreover, the current during discharging can be set in order to ensure that no exhaustive discharge of the battery string occurs. Accordingly, unwanted overcharging and/or exhaustive discharging can be prevented, thereby increasing both the service life of the battery modules 8 and consequently the availability of the drive system 1.

The string connection units 10 of the drive system 1 are mutually independently controllable, such that different string voltages and/or string currents can be set in the various battery strings 7. Each battery string 7 is connected by means of conductors 20 to a dedicated sensor system 13 for the battery string 7, by means of which e.g. the voltage on the individual battery modules 8 can be detected. The sensor system 13 is connected by a conductor 21 to a string control unit 14, via which the measured values recorded by the sensor system 13 are routed. For each battery string 7 or each string connection unit 10, a dedicated string control unit 14 is provided. According to the exemplary embodiment, the string control unit 14 is configured as a battery management system which, on the basis of the measured values detected by the sensor system 13, sets a working point for the battery string. Moreover, the disconnection or connection of the battery string 7 from or to the DC power supply system 2 is also controllable by means of the string control unit 14. Consequently, in the event of the occurrence of unwanted operating states on the battery modules 8 such as, for example, a short-circuit, overheating, or an unwanted state of charge, the battery string 7 can be isolated from the DC power supply system 2, in order to protect the battery modules 8 against further damage and/or to maintain the operation of the drive system 1.

The drive system 1 is moreover provided with a central drive system control unit 15 which is connected via conductors 23 to the string control units 14 for the individual battery strings 7, and via conductors 25 to the string connection units 10. By means of the drive system control unit 15, all the string connection units 10 on the drive system 1 can be controlled. In order to prevent any problems associated with the simultaneous control of the string connection units 10 by the string control units 14 and by the central drive control unit 15, a rule of precedence is applied. The string control unit 14 assigned to the respective string connection unit 10 will always assume precedence in the control of the string connection unit 10 over the drive system control unit 15. To this end, a release signal for the associated string connection unit 10 can be generated by each of the string control units 14. If the release signal is not present on the string connection unit 10, the battery string 7 will be disconnected from the DC power supply system 2 by the string connection unit 10. Conversely, if the string control unit 14 generates a release signal, the control of the string connection unit 10 by the drive system control unit 15 is released, such that the connection and disconnection of the battery string 7 can be influenced by the drive system control unit 15.

The drive system control unit 15 incorporates a user interface, via which an operator can enter commands for the control of the string connection units 10. For example, it can be provided that, by means of the user interface on the drive system control unit 15, individual battery strings 10 can selectively be switched-in or switched-out. The switching-out of individual strings may be necessary, for example, for the purposes of maintenance or servicing.

Optionally, it can be provided that the string connection units 10 are configured for mutual communication. To this end, the string connection units 10 can be interconnected by means of conductors 26.

The drive system 1 can be operated such that each of the string currents flowing in the battery strings 7 is set respectively by the string connection units 10.

For the limitation of string currents, a method is preferably employed in which a first limiting current value and a second limiting current value are predefined, whereby the second limiting value is quantitatively larger than the first limiting value. Specifically, the string current is measured continuously. If the string current exceeds the first limiting value, the string current is limited by the string connection unit 10. If, notwithstanding limitation by the string connection unit 10, the string current should rise thereafter, in the event of the overshoot of the second limiting value, the battery string 7 will be disconnected from the DC power supply system 2 by the string connection unit 10.

FIG. 3 shows a first configuration of a string connection unit 10 according to the invention. The string connection unit 10 incorporates a bidirectional voltage converter 11 and a switching device 12 connected in series with the voltage converter 11, by means of which the battery string 7 can be galvanically isolated from the DC power supply system 2.

To this end, the string connection unit 10 incorporates a bidirectional voltage converter 11, by means of which the system voltage on the side of the DC power supply system 2 can be converted into a string voltage on the side of the battery string 7, and vice versa. As the voltage converter 11 has a bidirectional configuration, energy can be transmitted selectively from the DC power supply system 2 to the battery string 7, or from the battery string 7 to the DC power supply system 2. The voltage converter 11 provides an advantage, in that charging and discharging processes on the battery string 7 can be regulated. Specifically, it is possible, during the charging of the battery string 7, for charging currents to be set and/or limited, in order to prevent any overcharging of the battery modules 8. Moreover, the current during discharging can be set and/or limited, in order to ensure that no exhaustive discharging of the battery modules 8 occurs. Moreover, any increase in current associated with a short-circuit can be limited by the voltage converter 11.

Moreover, in the string connection unit 10 according to FIG. 3, a switching device 12 is provided which can comprise, for example, a circuit breaker. According to the exemplary embodiment, the voltage converter 11 is directly connected to the DC power supply system 2 and the switching device 12 is directly connected to the battery string 7. Alternatively, the voltage converter 11 can be directly connected to the battery string 7 and the switching device 12 can be connected to the DC power supply system 2. Preferably, the voltage converter 11 can set the voltage on the DC power supply system 2 to a corresponding setpoint input value.

The voltage converter 11 and the switching device 12 are arranged in a common housing, such that cable routes between the voltage converter 11 and the switching device 12 can be kept short.

FIG. 4 shows a second configuration of a string connection unit 10 according to the invention. The string connection unit 10 according to the second configuration is configured such that the voltage converter 11 incorporates a switching device 12, by means of which the battery string 7 can be galvanically isolated from the DC power supply system 2.

FIG. 5 represents a voltage converter 11, which can be used in an aforementioned string connection unit 10. The voltage converter 11 is configured such that a system voltage on the DC power supply system 2 is selectively convertible into a higher or lower string voltage on the battery string 7. Moreover, by means of the voltage converter 11, both the system voltage on the power supply system 2 and the string voltage on the battery string 7 can be set. The voltage converter 11 can thus be operated, in both directions, selectively as a step-up converter and/or as a step-down converter.

The voltage converter 11 has a first terminal 50, which can be connected to the DC power supply system 2, and a second terminal 51, which can be connected to the battery string 7. On the terminal 50, a filter 52 configured as a current-compensated choke is connected, by means of which interference emissions can be damped.

The voltage converter 11 is of symmetrical design. A first capacitor 53 is connected in parallel with the first terminal 50. A second capacitor 54 is provided in a parallel arrangement with the second terminal 51. A first switch arm 56 is arranged in parallel with the first capacitor 53. A second switch arm 55 is arranged in parallel with the second capacitor 54. The switch arms 55, 56 are configured identically. The switch arms 55, 56 are each provided with a first switch 57, 59, which is arranged in series with a second switch 58, 60. Diodes 61, 62, 63, 64 are arranged respectively in parallel with the first switches 57, 59 and the second switches 58, 60. The switch arms 55, 56 are each provided with a tap, which is arranged between the first switch 57, 59 and the second switch 58, 60. The taps of the two switch arms 55, 56 are interconnected by means of an inductance 65.

The switches can be configured as semiconductor switches, specifically as MOSFETs, IGBTs or gate turn-off thyristors.

Various states are described hereinafter, in which the voltage converter 11 can be operated. To this end, the state of a switch 57, 58, 59, 60, in which said switch 57, 58, 59, 60 can conduct an electric current is described as "closed". In this state, a switch configured as an IGBT is conductive. The state of a switch 57, 58, 59, 60, in which said switch 57, 58, 59, 60 is isolated, and can thus conduct no current, is described as "open". A switch configured as an IGBT exercises a blocking function in this state.

In a first operating state of the voltage converter 11, short-circuit currents and/or discharging currents can be set and limited. The power flux proceeds from the second terminal 51 on the battery string 7 to the first terminal 50 on the DC power supply system 2. In the first operating state, the first switch 57 on the first switch arm 55 is open, and the second switch 58 on the first switch arm 55 is open, such that the output side of the inductance 65, via the first freewheeling diode 61 on the first switch arm 55, is connected with the system voltage on the DC power supply system 2 on the terminal 50. The second switch 60 on the second switch arm 56 remains open, whereas the first switch 59 on the second switch arm 56 is alternately opened and closed, such that the input side of the inductance 65 is alternately connected to the string voltage of the battery string 7 and to ground via the diode 64. Accordingly, the function of a step-down converter in the direction of the DC power supply system 2 is delivered.

In a second operating state of the voltage converter 11, charging currents can be set and/or limited. The power flux proceeds from the first terminal 50 on the DC power supply system 2 to the second terminal 51 on the battery string 7. In the second operating state, the first switch 59 on the second switch arm 56 is open, and the second switch 60 on the second switch arm 56 is open, such that the output side of the inductance 65, via the first freewheeling diode 62 on the second switch arm 56, is connected to the string voltage on the battery string 7 on the terminal 51. The second switch 58 on the first switch arm 55 remains open, whereas the first switch 57 on the first switch arm 55 is alternately opened and closed, such that the input side of the inductance 65 is alternately connected to the system voltage on DC power supply system 2 and to ground via the diode 63. Accordingly, the function of a step-down converter in the direction of the battery string 7 is delivered.

In a third operating state of the voltage converter 11, the system voltage on the DC power supply system 2 can be stepped up, for example, in order to support the operation of the fuel cell 5. The power flux proceeds from the first terminal 50 on the DC power supply system 2 to the second terminal 51 on the battery string 7.

In the third operating state, the first switch 59 on the second switch arm 56 is closed and the second switch 60 on the second switch arm 56 is open, such that the output side of the inductance 65 is connected to the string voltage on the battery string 7 on the terminal 51. The first switch 57 on the first switch arm 55 remains open, whereas the second switch 58 on the first switch arm 55 is alternately opened and closed, such that the input side of the inductance 65 is alternately connected to ground and, via the diode 61, to the system voltage on the DC power supply system 2. Accordingly, the function of a step-up converter in the direction of the battery string 7 is delivered.

The aforementioned drive system 1 for a submarine comprises a DC power supply system 2 for the supply of electrical energy to a drive 3 of the submarine and a number of battery strings 7, each comprising a plurality of series-connected battery modules 8, wherein the battery strings 7 are each connected to a string connection unit 10, via which the battery string 7 can be selectively connected to the DC power supply system 2 or disconnected from the DC power supply system 2, and wherein the string current flowing in the battery string 7 can be adjusted by the string connection unit 10. By this arrangement, any unwanted overcharging and/or exhaustive discharging of the battery strings 7 can be prevented, thereby increasing both the service life of the battery strings 7 and thus the availability of the drive system 1.

Moreover, the following advantages are provided: short-circuit currents on a battery string 7 can be limited by the regulation of the string current. Short-circuit currents can be switched-out. It is possible for the battery strings 7 to be galvanically isolated. Battery strings 7 can be switched-in and switched-out under service conditions. During charging and/or discharging, the string current on poor quality battery strings 7 can be limited, in order to prevent any overcharging or exhaustive discharging, thereby permitting the maximum possible energy to be delivered by the battery strings. Potential compensating currents associated with the interconnection of unequally charged battery strings 7 can be regulated and limited. The voltage on the battery strings 7 can be increased and/or regulated, in order to permit the setting of an optimum working point using the fuel cell 5. In a drive system 1 with gear steps, compensating currents can be limited and battery strings 7 can be set to a common voltage, further to the parallel connection thereof.

LIST OF REFERENCE NUMBERS

1 Drive system
2 DC power supply system
3 Drive
4 Generator
5 Fuel cell
6 Charging terminal
7 Battery string
8 Battery module
10 String connection unit
11 Voltage converter
12 Switching device
13 Sensor
14 String control unit
15 Drive system control unit
16 Submarine automation system
20, 21, 22, 23, 24, 25, 26 Conductor
50, 51 Terminal
52 Filter
53, 54 Capacitor
55, 56 Switch arm
57, 58, 59, 60 Switch
61, 62, 63, 64 Diode
65 Inductance

What is claimed is:

1. A drive system for a submarine comprising:
   a DC power supply system configured to supply electrical energy to a drive of the submarine;
   a plurality of battery strings, wherein each battery string includes a plurality of series-connected battery modules; and
   a plurality of string connection units, each of the plurality of string connection units comprising a bidirectional voltage converter and a switching device either connected in series to the bidirectional voltage converter or incorporated into the bidirectional voltage converter for galvanic isolation of each battery string from the DC power supply system, individual ones of the plurality of string connection units connected to a corresponding one of the plurality of battery strings via which each battery string is selectively connected to or disconnected from the DC power supply system, with each of the plurality of string connection units being configured to adjust a string current flowing in each corresponding battery string.

2. The drive system of claim 1 wherein each bidirectional voltage converter is configured such that a system voltage on the DC power supply system is selectively convertible into a higher or a lower string voltage on a corresponding battery string.

3. The drive system of claim 1 wherein each bidirectional voltage converter is configured such that both a system voltage on the DC power supply system and a string voltage on a corresponding battery string are adjustable.

4. The drive system of claim 1 wherein each string connection unit comprises a common housing for the bidirectional voltage converter and the switching device.

5. The drive system of claim 1 wherein the plurality of series-connected battery modules are comprised of lithium-ion batteries.

6. The drive system of claim 1 wherein the plurality of string connection units are mutually independently controllable.

7. The drive system of claim 1 wherein the plurality of string connection units are controllable by way of a drive system control unit.

8. The drive system of claim 7 wherein the plurality of string connection units are individually controllable by a dedicated string control unit for each of the plurality of battery strings, which is configured to take precedence over the drive system control unit.

9. The drive system of claim 1 further comprising a fuel cell associated with the DC power supply system.

10. A method for operating a drive system of a submarine, the method comprising:
    supplying electrical energy from a DC power supply system to a drive of the submarine and a plurality of battery strings, wherein each of the plurality of battery strings includes a plurality of series-connected battery modules;
    selectively connecting or disconnecting each battery string to the DC power supply system with a corresponding individual one of a plurality of string connection units, each of the plurality of string connection units comprising a bidirectional voltage converter and a switching device either connected in series to the bidirectional voltage converter or incorporated into the bidirectional voltage converter for galvanic isolation of each battery string from the DC power supply system; and adjusting a string current flowing in each battery string with the corresponding individual string connection unit.

11. The method of claim 10 comprising restricting the string current with a voltage converter in the individual string connection unit when a value of the corresponding string current exceeds a predefined first limiting value.

12. The method of claim 11 wherein the individual string connection unit disconnects the battery string from the DC power supply system when a value of the corresponding string current exceeds a predefined second limiting value, which is quantitatively larger than the predefined first limiting value.

* * * * *